Figure 1:
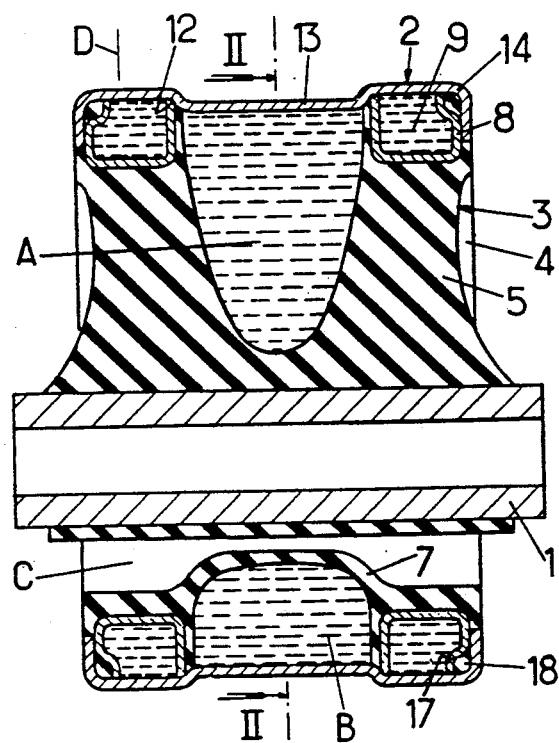

United States Patent [19]

Thelamon et al.

[11] Patent Number: 5,102,106
[45] Date of Patent: Apr. 7, 1992

[54] HYDRAULIC ANTIVIBRATORY SLEEVES

[75] Inventors: Jean Thelamon, Bonneval; Paul Schwartz, Chateaudun, both of France

[73] Assignee: Hutchinson, Paris, France

[21] Appl. No.: 617,031

[22] Filed: Nov. 21, 1990

[30] Foreign Application Priority Data

Nov. 24, 1989 [FR] France ............... 89 15494

[51] Int. Cl.$^5$ .............................................. F16F 5/00
[52] U.S. Cl. ......................... 267/140.1 C; 267/219; 248/562
[58] Field of Search ............... 267/140.1 R, 140.1 C, 267/153, 219; 180/300, 312, 902; 248/562, 636

[56] References Cited

U.S. PATENT DOCUMENTS

| 4,717,111 | 1/1988 | Saito ................................ 248/562 |
| 4,809,960 | 3/1989 | Kakimoto et al. ............... 267/153 |
| 4,871,151 | 10/1989 | Kanda ........................ 267/140.1 C |
| 4,896,868 | 1/1990 | Thelamon et al. ........... 267/140.1 C |
| 4,909,489 | 3/1990 | Doi .................................. 248/562 |
| 4,936,557 | 6/1990 | Schwerdt ........................ 267/219 |

Primary Examiner—Joseph F. Peters, Jr.
Assistant Examiner—Virna Lissi Mojica
Attorney, Agent, or Firm—Larson and Taylor

[57] ABSTRACT

A hydraulic antivibratory sleeve comprising two rigid tubular frames (1, 2), one surrounding the other and joined together by an elastomer body (3) shaped so as to form therewith at least two diametrically opposite sealed pockets (A, B) communicating together through a narrow channel (9), the assembly of said pockets and said narrow channel being filled with a damping liquid, the portion of the elastomer body which defines one at least of the pockets (A) having in axial section the general form of a U or a V open radially outwardly and being adhered to two rigid annular shaped sections (8) one at least of which contains the narrow channel. The mutual axial spacing of the two shaped sections (8) is provided by means of bosses (12, 15, 16) formed on the internal face of this frame (2).

5 Claims, 2 Drawing Sheets

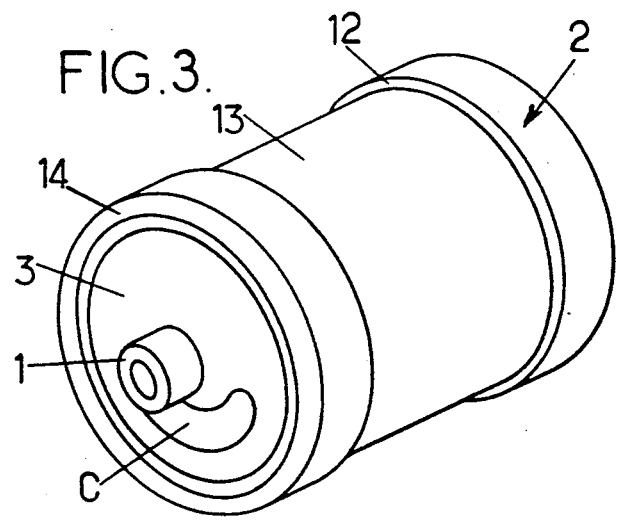
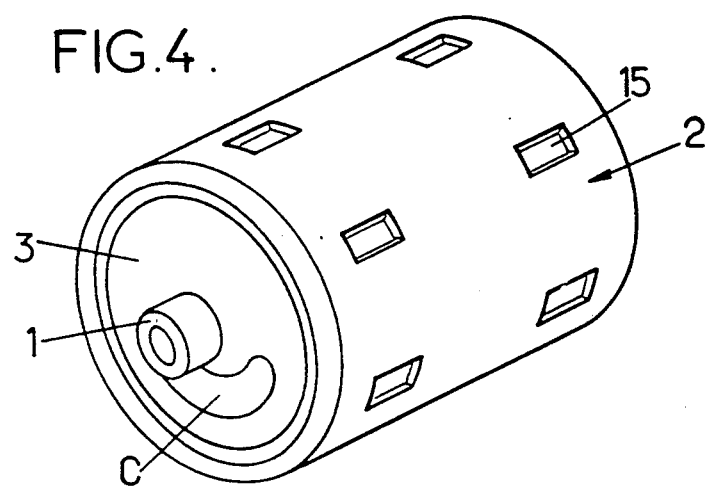
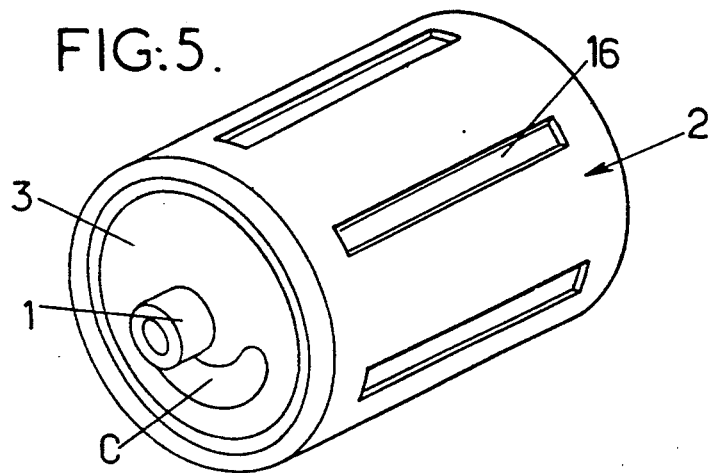

HYDRAULIC ANTIVIBRATORY SLEEVES

The invention relates to hydraulic antivibratory sleeves comprising two rigid tubular frames, one surrounding the other, and preferably at least partially of revolution, coaxial and concentric at least under load, which frames are joined together by an elastomer body shaped so as to form therewith at least two sealed pockets which are diametrically opposite in a direction D and communicate together through a narrow channel, the assembly of said pockets and said narrow channel being filled with a damping liquid.

Such sleeves are intended to be fitted between two rigid parts fixed respectively to the two frames and capable of withstanding, with respect to each other, oscillations oriented in the diametrical direction D, the whole being arranged so that, for some at least of these oscillations, the liquid is driven alternately from one of the pockets to the other and inversely through the narrow channel, which creates in this liquid, for a given oscillation frequency whose value F is related directly to the dimensions of said channel, a resonance phenomenon capable of damping the transmission of these oscillations from one of the frames to the other.

The sleeves of the kind in question are for example intended to be inserted between a vehicle chassis and the internal combustion engine or the front or rear wheel assembly of this vehicle.

The invention relates more particularly, among the above sleeves, to those in which the portion of the elastomer body which defines one at least of the pockets has in axial section the general form of a U or V open radially outwardly and is adhered to two rigid annular shaped sections which have as axis the axis of the external tubular frame and which are disposed respectively inside the two axial ends of this frame, in the vicinity of these ends, one at least of these two shaped sections containing the above narrow channel.

Such sleeves have been described in the patent EUROPE no. 0 248 714.

In known embodiments of such sleeves, the two rings are generally spaced axially apart from each other by disposing a cylindrical ring axially between them, which ring may be formed of two pieces each extending over a little less than a half circle and which is generally juxtaposed against the inner face of the external tubular frame.

This ring is relatively costly and heavy.

The object of the invention is especially to omit it.

For this, sleeves of the kind in question according to the invention are essentially characterized in that the mutual axial spacing of the two annular shaped sections is maintained by means of bosses forming part of the external tubular frame and projecting from the internal face of this frame, which bosses are formed between the shaped sections so as to form axial stops therefor.

In advantageous embodiments, recourse is further had to one and/or other of the following arrangements:

the bosses are formed by a narrowed cylinder portion forming part of the external frame, said portion being defined at both its axial ends by two annular steps which skirt the two shaped sections and being obtained by radial contraction of the portion, of the external frame, disposed axially between the two shaped sections, the bosses are formed by stamping hollows in the external face of the external tubular frame, the above hollows are distributed in two circles having as axis the axis of the external tubular frame and each skirting one of the two shaped sections, the above hollows form rectilinear grooves extending, parallel to the axis of the external tubular frame, from one of the two shaped sections to the other.

Apart form these main arrangements, the invention comprises certain other arrangements which are preferably used at the same time and which will be more explicitly discussed hereafter.

In what follows, some embodiments of the invention will be described with reference to the accompanying drawings in a way which is of course in no wise limitative.

Figure 2:
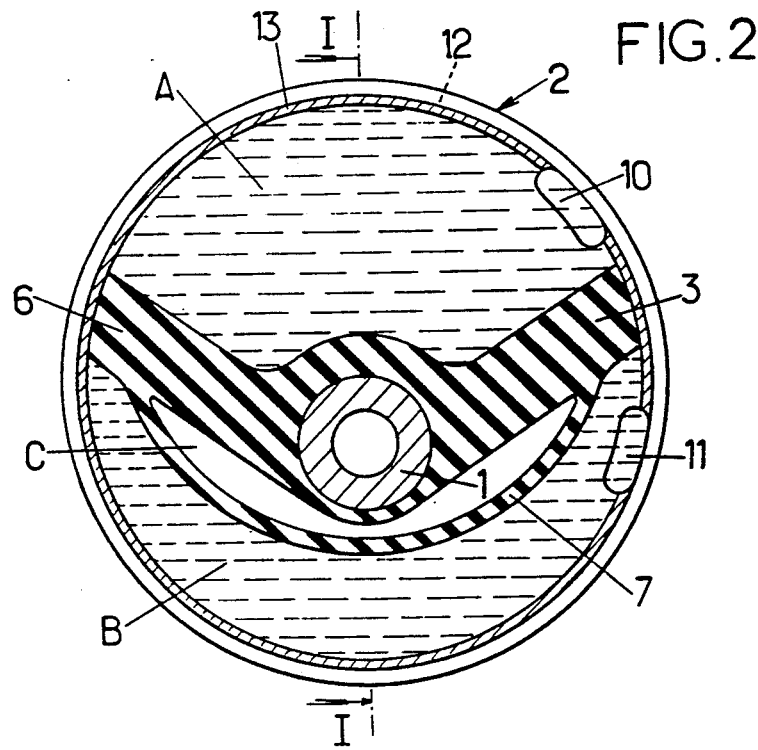

FIGS. 1, 2 and 3 of these drawings show a hydraulic antivibratory sleeve constructed in accordance with the invention, respectively in axial section through I—I of FIG. 2, in cross section through II—II of FIG. 1 and in respective view.

FIGS. 4 and 5 show in perspective respectively two variants of such a sleeve, also in accordance with the invention.

The sleeve in question comprises :

an internal tubular metal frame of revolution 1, an external tubular metal frame of revolution 2 which surrounds frame 1 and which, for the assembled and loaded condition of the sleeve, may be coaxial with this frame 1, the axes of the two frames being in any case parallel to each other with the sleeve at rest, and an elastomer body 3 connecting the two frames 1 and 2 together and forming therebetween two sealed pockets A, B diametrically opposite in a direction D.

The internal frame 1 is intended to be fastened to a pin (not shown) which passes jointingly therethrough whereas the external frame 2 is intended to be fixed to a bearing (not shown), this pin and this bearing being respectively firmly fixed to two rigid elements between which it is desired to fit an antivibratory support, elements such as a vehicle engine and the chassis of this vehicle.

A portion of the body 3, which is assumed here purely by way of illustration to be its upper half, has under load a form of revolution about the axis common to the two frames 1 and 2 with an axial half section in the form of a U or a V, two shallow grooves 4 open axially outwardly of the sleeve being formed in the two front walls 5 of said portion.

This portion also comprises two radial arms 6 which are diametrically opposite or extend in the form of a widely open V as can be seen in FIG. 2, which arms define with walls 5 and the external frame 2 the chamber A.

The portion of body 3 which defines chamber B is formed by a thin flexible membrane 7.

This membrane is in the form of a strip curved in a semi-circle and slightly bulging towards the axis. This strip has two semi-circular edges connected sealingly to the external frame 2 and the two ends of said strip considered in the circumferential direction are connected to the radial arms 6, a pocket C opening axially to the free air being thus formed between these arms and membrane 7.

The portions, of the elastomer body 3, corresponding to the ends of the U or V, are adhered to two circular shaped sections 8 having a cross section in the form of a U open radially outwardly.

These shaped sections are sealingly closed by the axial ends of the external tubular frame 2 so as to form two narrow circular channels 9.

Each of these narrow channels 9 opens laterally through orifices 10, 11 into the two chambers A and B respectively.

Chambers A and B as well as the portions of channels 9 connecting these chambers together are filled with a liquid.

To hold the two shaped sections 8 spaced axially apart from each other, in embodiments known up to now, a cylindrical ring apertured or not was disposed therebetween, inside frame 2.

Here, no such ring is provided and the mutual axial spacing apart of the two shaped sections 8 is provided by means of bosses formed on the inner face of frame 2 : by "bosses" is here meant portions of frame 2 themselves projecting inwardly thereof and obtained by local deformation thereof.

In the first embodiment illustrated in FIGS. 1 to 3, the bosses 12 in question extend over the whole periphery of the sleeve and are obtained by contraction of the portion of the external tubular frame which is disposed axially between the shaped sections 8 by means of a multi-shell tool.

The bosses thus obtained are in the form of steps 12 juxtaposed axially against the two shaped sections 8 and joining to the two axial non deformed ends of frame 2 a narrow tube portion 13 forming the central portion of this frame.

In the variants illustrated in FIGS. 4 and 5, the bosses are formed by local punching of the outer face of the external frame 2 by die-stamping.

In the embodiment of FIG. 4, such punching forms two circles of hollows 15 of a generally rectangular shape having a large side parallel to the axis of the sleeve, each of said hollows corresponding of course to a boss projecting on the inner face of frame 2, each boss being juxtaposed axially to one of the two shaped sections 8.

In the embodiment of FIG. 5, the bosses are ribs extending parallel to the axis of the sleeve and corresponding to longitudinal grooves 16 formed parallel to each other in the outer face of the external tubular frame 2, all around the latter, the longitudinal ends of said ribs being juxtaposed against the shaped sections 8.

There can be further seen at 14 in FIG. 1 the end edges of the external tubular frame 2 which are bent down for crimping against the shaped sections 8.

It should be noted that the outer flanges of these shaped sections have an edge 17 offset inwardly. Since the peripheries of said shaped sections are embedded in the elastomer forming body 3, this set-back makes it possible to form an outer annular elastomer bead 18, the crushing of which during crimping of the above edges 14 provides excellent sealing of the finished sleeve with respect to the liquid inside.

It will be understood that whatever the embodiment adopted, the presence of the bosses projecting from the inner face of the external tubular frame 2 results in maintaining the axial spacing between the two shaped sections 8 at a constant value. There is thus no need of the spacing ring which was used in prior constructions.

Following which and whatever the embodiment adopted, hydraulic antivibratory sleeves are finally obtained whose construction and advantages are sufficiently clear from the foregoing.

As is evident, and as it follows moreover already from what has gone before, the invention is in no wise limited to those of its modes of application and embodiments which have been more especially considered; it embraces, on the contrary, all variants thereof, particularly :

those in which the rigid annular shaped sections have a cross section different from that explained above, for example with closed contour, or else in the form of a U open axially outwardly of the sleeve, this section then of course being closed again by any desirable means so as to form the narrow channels of communication between the chambers of the sleeve, and those in which the form of the hollows stamped in the outer face of the external tubular frame and distributed in two circles are other than rectangular, for example circular, each hollow then having the shape of a spherical skull cap or a half sphere.

We claim:

1. Hydraulic antivibratory sleeve comprising two rigid tubular frames, one surrounding the other and joined together by an elastomer body shaped so as to form therewith at least two diametrically opposite sealed pockets communicating together through a narrow channel, the assembly of said pockets and said narrow channel being filled with a damping liquid, the portion of the elastomer body which defines at least one of the pockets having in axial section the general form of a U or a V open radially outwardly and being adhered to two rigid annular shaped sections which have a common axis that is the same as the axis of the external tubular frame and which are disposed respectively inside the two axial ends of said external tubular frame, in the vicinity of said ends, at least one of these two shaped sections containing the narrow channel, the improvement comprising bosses providing the mutual axial spacing of the two annular shaped sections, said bosses forming part of the external tubular frame and projecting from the internal face of said external tubular frame, and said bosses being formed between the annular shaped sections so as to form axial stops therefor.

2. Sleeve according to claim 1, characterized in that the bosses are formed by a narrowed cylinder portion forming part of the external frame, said portion being defined at both its axial ends by two annular steps which skirt the two shaped sections and being obtained by radial contraction of the portion, of the external frame, disposed axially between the two shaped sections.

3. Sleeve according to claim 1, characterized in that the bosses comprise stamped hollows formed in the external face of the external tubular frame.

4. Sleeve according to claim 3, characterized in that the hollows are distributed in two circles having as axis tee axis of the external tubular frame and each skirting one of the two shaped sections.

5. Sleeve according to claim 3, characterized in that the hollows form rectilinear grooves extending, parallel to the axis of the external tubular frame from one of the two shaped sections to the other.

* * * * *